United States Patent [19]

Bergsoe

[11] 4,402,491
[45] Sep. 6, 1983

[54] APPARATUS FOR RECLAIMING LEAD AND OTHER METALS

[75] Inventor: Svend Bergsoe, Glostrup, Denmark

[73] Assignee: Paul Bergsoe & Sons A/S, Glostrup, Denmark

[21] Appl. No.: 402,375

[22] Filed: Jul. 28, 1982

[51] Int. Cl.³ .............................................. F27D 17/00
[52] U.S. Cl. ................................... 266/144; 266/205; 266/901; 75/77
[58] Field of Search ............... 266/200, 205, 900, 901, 266/144; 75/77, 78, 63, 65, 44 S

[56] References Cited

U.S. PATENT DOCUMENTS

| | | | |
|---|---|---|---|
| 1,938,582 | 12/1933 | Davis | 266/901 |
| 3,770,419 | 11/1973 | Brown | 75/44 S |
| 4,194,904 | 3/1980 | Foerster et al. | 75/78 |

FOREIGN PATENT DOCUMENTS

| | | | |
|---|---|---|---|
| 650657 | 10/1937 | Fed. Rep. of Germany | 266/900 |
| 2020402 | 11/1979 | United Kingdom | 266/205 |

Primary Examiner—M. J. Andrews
Attorney, Agent, or Firm—Harvey B. Jacobson

[57] ABSTRACT

A reactor for reclaiming lead and other metals from scrap batteries which includes two reaction chambers with the upper end of one chamber having a scrap feeding mechanism and at least one burner to melt lead and other metals and ignite organic materials. The chambers are interconnected at their low points for gravity flow of molten metal into a sump. The other reaction chamber is connected with an exhaust system and provided with baffles to retain gases for a predetermined time. The sump includes a tap for slag and a siphon discharge for molten lead. Also, air or oxygen may be introduced into the reaction chambers and/or the sump.

17 Claims, 4 Drawing Figures

APPARATUS FOR RECLAIMING LEAD AND OTHER METALS

FIELD OF THE INVENTION

This invention relates to the recovery of metals from articles containing metals in combination with combustible materials, but more particularly to a method for the recovery of lead and other valuable metals from discarded lead acid storage batteries.

DESCRIPTION OF THE PRIOR ART

Lead acid storage batteries are generally composed of plates or electrodes in which the electrochemically active paste of lead compounds is supported by grids of lead or lead alloy metal. Anodes and cathodes are insulated from each other by means of non-metallic separators and the structure is immersed in a sulphuric acid electrolyte contained in an outer case of plastic or hard rubber. Also contained in the cases are current collectors in the form of lead alloy conductors, interconnecting groups of anodes and groups of cathodes, respectively. Discarded batteries are generally considered valuable only for their content of lead and alloy metals, but it has become possible also to recover some plastic values from batteries contained in such casings.

In order to recover the metal values only or to recover both metal and plastic values, it has hitherto been necessary to separate the two types of material from each other. The separation can be effected by manual breaking and sorting or by mechanized separation processes such as sink-float or wind separation as described for instance in U.S. Pat. No. 4,118,219 and several other patents.

Following separation, the plastic fraction must be carefully rinsed to remove all lead containing material while the lead containing fraction or fractions can be treated hydrometallurgically and electrolytically to recover the metal. Such procedures are described in U.S. Pat. Nos. 3,883,348, 4,107,007, 4,118,219 and 4,229,271. More commonly the lead bearing fractions have been treated by pyrometallurgical processes in reverberatory or blast furnaces followed by thermometallurgical refining to recover the metals in usable form. The furnaces themselves are well known in the art, but several improvements have been patented as exemplified by U.S. Pat. Nos. 4,102,676 and 4,115,109.

Whether smelting or hydrometallurgical routes are followed in the recovery of the metals, it has hitherto been necessary to separate the organic materials wholly or in part from the metal bearing fractions. It would be highly desirable to bypass the mechanical separation, because it makes it necessary either to deposit lead containing waste materials, or to clean such materials very carefully for depositing or for reuse, and hence causes handling and treating large amounts of waste water contaminated with lead and other heavy metals. In addition, the separation process, whether manual or mechanical, involves a very real work hazard for its operators. Although not materially different from the hazards of other lead industry work, this hazard would be completely eliminated if the separation step could be bypassed.

U.S. Pat. No. 2,826,490 represents an attempt to bypass the separation step by teaching a battery reclaiming method in which old drained batteries are treated in a special furnace that utilizes the heat of combustion from the organic materials, notably the battery cases, to melt the metallic lead parts in the batteries. However, the temperature and furnace conditions are such that the non-metallic lead compounds such as oxides and sulphate that are present in very considerable quantity in discarded batteries, become thoroughly dried and appear as a very fine, powdery dross or ash after the process. This is not desirable from the point of view of hygiene. Operation of the process further requires the batteries to be fed one by one to the furnace preferably in an upside down position, making the process less amenable to mass production.

In copending U.S. patent application, Ser. No. 195,435, there is disclosed a method of smelting whole, drained batteries in a blast furnace without any previous step of separation other than draining the acid. The method uses a very wide blast furnace combined with a large afterburner and several other features to deal with the combustion of organic material, while at the same time performing a complete smelting and reduction of the lead and lead compounds present in the batteries. Due to the nature of the blast furnace the process must be operated continuously on a large scale, and furthermore the heat of combustion of the battery cases can only be partially utilized so that the process has a comparatively high overall energy consumption.

SUMMARY OF THE INVENTION

An object of the present invention is to smelt whole, drained batteries with maximum utilization of the heat of combustion of the battery cases, in a process that can be operated on both small and large scale, while at the same time overcoming the aforementioned difficulties in the prior art.

According to the invention, a special reactor is used, into which drained batteries are fed continuously or intermittently, and where such a temperature is maintained that the volatile organic materials in the battery cases immediately are gasified and ignited. During a retention time in the reactor of not less than 1.5 seconds the gaseous fraction undergoes complete combustion, delivering most of their heat of combustion to the reactor walls and to the solid and liquid charge material contained therein. The hot gas leaving the reactor basically consists of carbon dioxide, water vapor and excess air or nitrogen, but it also contains lead fumes and entrained dust. The gas must be purified by conventional means and the collected dust recycled in the process.

As the organic materials evaporate and burn, the lead compounds contained as paste and sludge in the batteries are reduced and smelted to form molten lead. At the same time the metallic lead or lead alloy present as grids etc. melts and mixes with the lead reduced from compounds. The bottom of the reactor can either be shaped as a sump or well to receive the molten metals, or it can be connected through a metal outlet to a forehearth receiving the molten metal. By controlling the atmosphere in the lowest part of the reactor or in the forehearth, and by blowing air, oxygen, or oxygen-enriched air onto the surface of the molten metal bath, continuous softening of the lead can be obtained by preferential oxidation of the antimony present as an alloy constituent. Together with some lead oxide the antimony oxide forms a liquid antimony-rich slag that also dissolves such inorganic and non-metallic impurities that may have been present in the original batteries. The liquid slag can be tapped intermittently for later recovery of its metal contents in conventional metallurgical furnaces.

The softened lead is tapped from the bottom of the reactor or forehearth, either intermittently or continuously via a siphon arrangement. In contrast with the blast furnace the reactor of this invention does not need to be constantly filled with charge material, fuel and fluxes, and the process can be operated in short or long periods or campaigns as required.

In one embodiment of the invention the reactor consists of two interconnected chambers, both lined with suitable refractory material to withstand the temperatures involved. The first chamber is horizontal or inclined at an angle of not more than 45°. Batteries are fed into this chamber via an airlock in the upper part which is also provided with oil or gas burners to preheat the reactor and to ignite organic materials in the feed. The lower part of the chamber forms a sump or well, that contains the molten lead and can be provided with a siphon tap system for lead. The lower part is also provided with means for blowing air or oxygen onto the molten metal bath.

The second chamber extends upwards from the lower part of the first chamber and is in direct connection therewith. The interior, refractory lined walls of the second chamber may be provided with baffles that introduce a turbulent gas flow to assist mixing and complete combustion of the gases. The far end of the second chamber is connected to a conventional gas purification plant through which the combustion gases are exhausted and emitted to the atmosphere.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
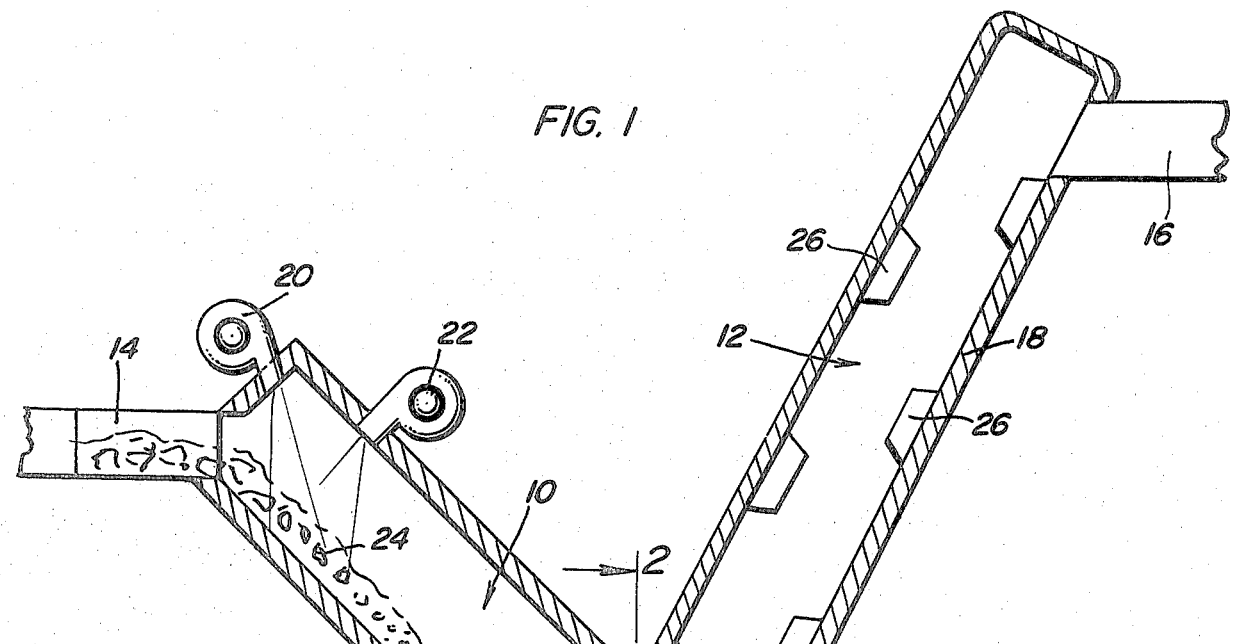
FIG. 1 is a longitudinal sectional view through a reactor according to the invention, containing a sump of molten lead in the lower part of the first reaction chamber.

Referring in more detail to the drawings the reactor in FIG. 1 comprises two reaction chambers 10, 12 that are interconnected in the lower part of the reactor. The upper part of chamber 10 is connected to an airlock feeding mechanism 14 and the upper part of chamber 12 to the exhaust flue 16. The reactor as a whole is lined with suitable refractory material 18 to withstand the temperatures and contact with the gases, feed stock material, molten metal and slag. The upper part of chamber 10 is provided with one or several burners 20, 22 directed towards the feed stock 24 that is fed into the reactor via airlock 14. The interior wall of chamber 12 may be provided with several baffles 26 made from suitable refractory material. As the organic material in the incoming feed stock 24 is ignited by burners 20, 22 or by already burning materials in the reactor, the lead-containing materials are heated and reduced to form molten lead 28 that flows down to the bottom of chamber 10, forming a sump or well of molten lead 30. The atmosphere in the lowest part 32 of chamber 10 can be controlled by blowing gases such as oxygen or oxygen-enriched air through tuyeres or nozzles 34 onto the surface of the metal sump 30. Molten lead is finally tapped through siphon 36 into a suitable receptacle 38.

Figure 2:
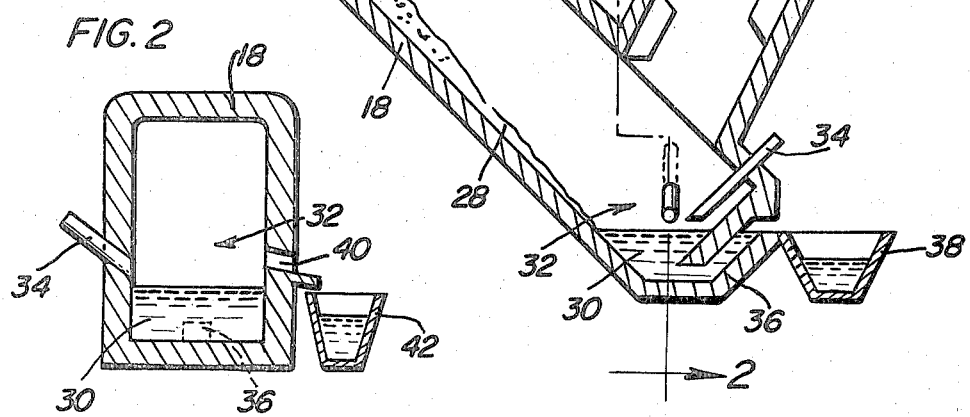
FIG. 2 is a sectional view of the lower part of the reactor taken generally along section line 2—2 on FIG. 1.

Referring to FIG. 2, tuyeres 34 can also be arranged in the sides of the reactors just above the surface of the molten material, and a tap-hole 40 allows slag to be tapped intermittently into a suitable receptacle 42.

Figure 3:
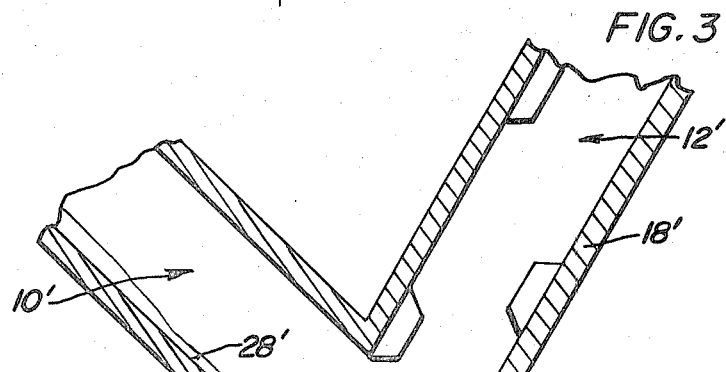
FIG. 3 is a longitudinal sectional view of the lower part of another reactor according to the invention, in which the bottom of the first reaction chamber is connected to a separate forehearth.
Figure 4:
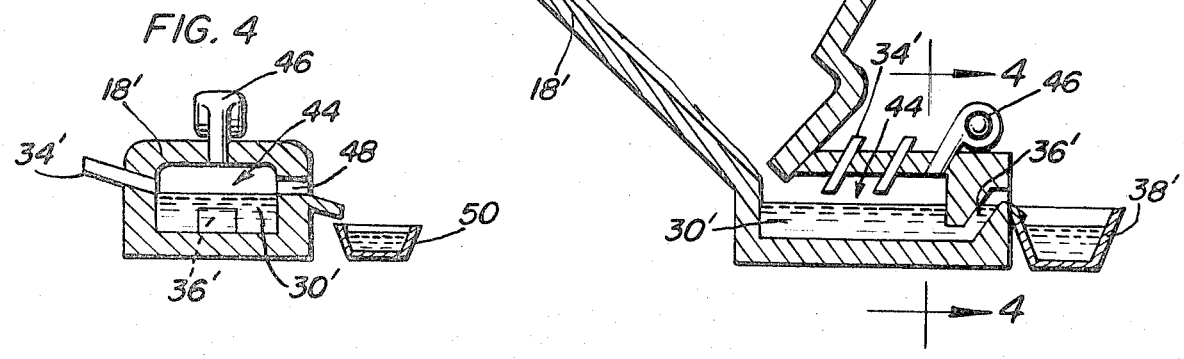
FIG. 4 is a sectional view of the forehearth in FIG. 3 taken generally along section line 4—4 on FIG. 3.

Referring to FIG. 3, only the lower part of chambers 10' and 12' is shown in this illustration with their refractory linings 18'. In this reactor the molten lead and slag 28' flows into a forehearth 44 in which tuyeres 34' can be arranged in the roof or in the side walls. The molten lead forms a sump or well of molten lead 30' and is tapped from the bottom via a siphon 36' into a suitable receptacle 38'. The forehearth is equipped with an additional burner 46 for preheating, and as only illustrated in FIG. 4, with a taphole 48 through which slag can be tapped into a receptacle 50.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An apparatus for reclaiming lead and other metals from scrap containing organic materials in appreciable quantities, such as whole, drained, junk batteries comprising:
   (a) an extended combustion and smelting reactor, having such dimensions that the reaction gases are retained within it for a predetermined time and being lined with suitable refractories that can withstand the temperatures of the reaction gases;
   (b) an airlock mechanism for feeding the lead-containing scrap into one end of the reactor;
   (c) burner means arranged near ther same end of the reactor and designed to preheat the reactor and to ignite organic materials in the lead-containing scrap;
   (d) a sump or well for collecting molten lead or lead alloy in the central part of the reactor; and
   (e) an exhaust port in the far end of the reactor for the escape of gases and combustion products formed in the reactor, said exhaust port being connected to an active exhaust system.

2. An apparatus according to claim 1 wherein the reactor comprises two elongated reaction chambers that are interconnected at or near the sump or well.

3. An apparatus according to claim 2 wherein the elongated reaction chamber in which the feeding mechanism is arranged slopes downwards towards the sump at an angle of not more than 45° in relation to horizontal, while the other elongated reaction chamber extends upwards from the sump.

4. An apparatus according to claim 1 wherein the airlock feeding mechanism is arranged at or near the top of the first chamber thereby allowing the lead-containing scrap to slide downwards inside the chamber.

5. An apparatus according to claim 1 wherein the burner means arranged so that their flames are directed towards the general area where the lead-containing scap enters the reaction chamber.

6. An apparatus according to claim 1 wherein the lead sump or well is connected to a siphon outlet for continuous tapping of the metal.

7. An apparatus according to claim 2 wherein the interior walls of the reaction chamber extending to the exhaust port are provided with baffles.

8. An apparatus according to claim 1 wherein tuyeres are arranged through the reactor walls over the lead sump for blowing air, oxygen or oxygen-enriched air onto the bath of molten lead.

9. An apparatus according to claim 1 wherein said reactor includes a downwardly sloping first chamber having the air lock mechanism at the upper end thereof and an upwardly extending second chamber having its lower end communicated with the lower end of the first chamber and having the exhaust port in the upper end thereof, said sump being communicated with the lower end of the first chamber and including outlet means for tapping of the molten lead or lead alloy.

10. An apparatus according to claim 9 wherein said outlet means includes a syphon outlet.

11. An apparatus according to claim 10 wherein said sump is located in the lower end of said first chamber below the point of communication of the first and second chambers.

12. An apparatus according to claim 10 wherein said sump includes a forehearth communicated with and extending from the lower end of the first chamber.

13. An apparatus according to claim 12 in which a burner extends through the upper wall of the forehearth and oxygen supplying tuyeres extending into the area above the upper surface of the molten metal in the forehearth and a tap hole in the forehearth through which slag can be tapped from the forehearth.

14. An apparatus according to claim 11 together with tuyeres communicating with the sump above the upper surface of the molten metal therein and a tap hole in the reactor for removing slag from the sump.

15. An apparatus according to claim 9 wherein the second chamber includes baffle means to control the flow of reaction gases to the exhaust port for maintaining the gases within the reactor for a predetermined time.

16. An apparatus in accordance with claim 15 wherein the downward inclination of the first chamber is at an angle of not more than 45° to provide for gravity flow of material from the air lock mechanism toward the sump.

17. An apparatus according to claim 16 wherein the baffles retain the reaction gases in the reactor for not less than approximately 1.5 seconds to provide complete combustion of organic material and delivering most of the heat of combustion to the reactor walls and to the lead-containing scrap introduced into the reactor, said burner means including burners oriented at the upper end portion of the first chamber and directed toward the scrap entering the first chamber to ignite and burn organic material in the scrap and melting the metal components of the scrap and combining with the heat of combustion of the organic material in the scrap to melt the metal components in the scrap.

* * * * *